Patented Apr. 14, 1925.

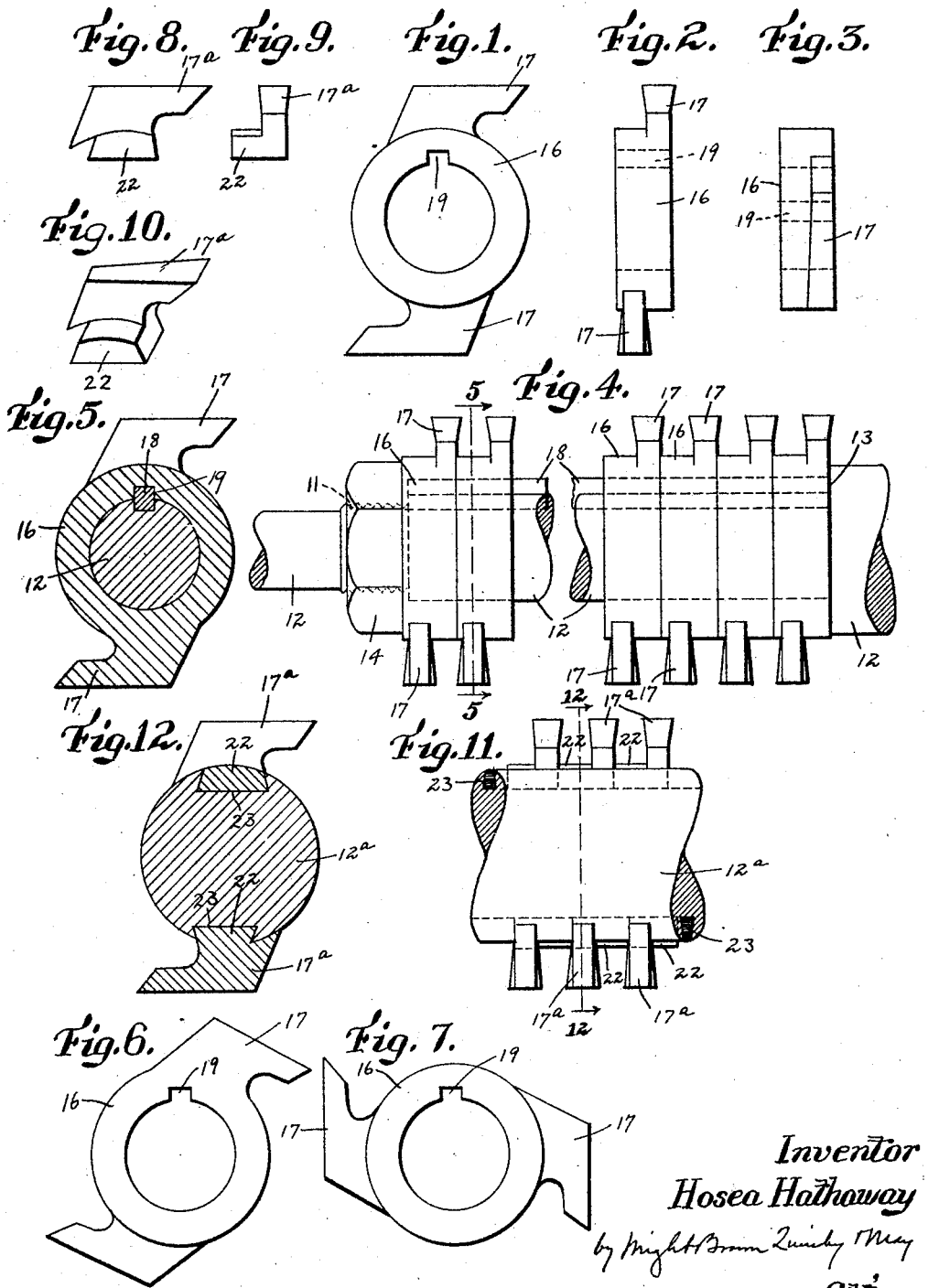

1,533,547

UNITED STATES PATENT OFFICE.

HOSEA HATHAWAY, OF BROOKLINE, MASSACHUSETTS.

SLOTTING TOOL.

Application filed January 23, 1924. Serial No. 687,916.

*To all whom it may concern:*

Be it known that I, HOSEA HATHAWAY, a citizen of the United States, residing at Brookline, in the county of Norfolk and State of Massachusetts, have invented new and useful Improvements in Slotting Tools, of which the following is a specification.

My invention relates to a tool adapted to form a continuous elongated slot or kerf in a tree trunk, the slot extending from the surface at one side toward the opposite side until the trunk is partially or wholly severed.

The invention is an improvement on that of my Patent No. 1,328,430, dated January 20, 1920, which discloses a combined boring and slotting tool having boring cutters and slotting cutters or chisels, all made in one piece and adapted to first bore a hole in a tree trunk by a longitudinal movement of the tool, and then laterally enlarge the hole by a lateral movement of the tool.

The object of the present invention is to provide a tool adapted to sever a tree trunk by forming a slot or kerf therein, commencing at the external surface of the trunk and caused by a lateral movement of the tool to progress crosswise of the trunk, the tool comprising a rotary shaft or spindle and a plurality of rows of chisels detachably secured to the spindle, so that a broken chisel may be removed and replaced by another without discarding the entire tool, the chisels of each row being spaced apart, so that they form alternating grooves and narrow ridges between the grooves, and the chisels of one row being in staggered relation to those of another row, so that the ridges formed by one row of chisels are removed by the chisels of another row.

I attain this and other related objects by the improved construction hereinafter described and claimed.

Of the accompanying drawings forming a part of this specification,—

Figures 1, 2 and 3 are side and edge views of one of the collars hereinafter described, and chisels carried by said collars, according to the preferred embodiment of the invention.

Figure 4 is a side view of a tool embodying the invention, including a spindle and a plurality of collars and chisels shown by Figures 1, 2 and 3, a portion of the tool being broken away.

Figure 5 is a section on line 5—5 of Figure 4.

Figures 6 and 7 are views similar to Figure 1, showing different arrangements of the chisels with relation to the key-receiving slot hereinafter described.

Figures 8 and 9 are side and end views of a modified form of chisel.

Figure 10 is a perspective view of the chisel shown by Figures 8 and 9.

Figure 11 is a view similar to a portion of Figure 4, showing chisels formed as shown by Figures 8, 9 and 10.

Figure 12 is a section on line 12—12 of Figure 11.

The same reference characters indicate the same parts in all of the figures.

Referring first to Figures 1 to 7, inclusive, showing the preferred embodiment of the invention, 12 designates a rotary spindle which may be supported by suitable bearings on a portable frame (not shown), so that the spindle may be moved laterally toward the trunk of a standing tree to cause the chisels hereinafter described, revolved by the spindle, to form a slot or kerf in the trunk until the latter is wholly or partially severed.

The spindle 12 is provided with a shoulder 13, forming an abutment, and with an adjustable confining member 14, preferably a nut separably engaged with a threaded portion 11 of the spindle.

The chisels next described are clamped upon the spindle between the abutment 13 and the confining member 14, and are interlocked with the spindle, so that they are positively revolved by the latter.

In this instance the chisels are grouped in two rows, extending lengthwise of the spindle. The chisels of each row are spaced apart so that they form grooves alternating with narrow ridges. The chisels are parts of units adapted to be clamped side by side on the spindle. Each unit includes a collar 16, surrounding and slidable on the spindle, and two chisels 17, formed as shown by Figures 1, 2 and 3, projecting from opposite sides of the collar. As shown by Figure 2, one chisel projects from one edge of the collar, and the other from the opposite edge, the collar being wider than the chisels, so that the chisels of each row are in staggered relation to the chisels of the other row. The chisels of each row are therefore adapted to remove the ridges between the grooves formed by the chisels of the other row.

The spindle and the collars are provided with interlocking means whereby the chisels are positively revolved by the rotation of the spindle, said means being embodied in a key 18, fixed to the spindle and extending between the abutment 13 and confining member 14, and slots 19, formed in the internal surfaces of the collars 16, and receiving the key. The arrangement is such that the chisels are grouped in two longitudinal rows, which may be straight rows as indicated by Figure 4, the cutting edges being abreast of each other. The rows may be made spiral by varying the relative positions of the chisels and the slots 19, as indicated by Figures 1, 6 and 7. The chisels of each row are located in staggered relation to the chisels of the other row, in the embodiment shown by Figures 1, 2, 3 and 4, by the location, in each unit, of one chisel at one edge, and the other at the opposite edge of the collar 16, the edges of each collar constituting spacing means.

I do not limit myself to the employment of two chisels on each collar, although the employement of more than one chisel is necessary.

Figures 8 to 12 show a modification in which the chisels of one row are formed separately from those of the other row, the chisels being designated by 17$^a$, and each being provided with spacing means, formed as a dovetail shank 22 projecting from one side of the chisel. The spindle, here designated by 12$^a$, is provided with dovetail grooves 23, receiving the shanks 22. As shown by Figure 11, the arrangement is such that the chisels 17$^a$ of each row are spaced apart, and are in staggered relation to the chisels of the other row.

It will now be seen that the tool is adapted for use as an element of a tree-felling machine, which includes a movable frame having bearings supporting the spindle, and means for driving the spindle, the frame being movable to press the chisels against the trunk and cause them to form a slot or kerf therein. The length of the tool must, of course, exceed the diameter of the trunk. As shown by Figures 2, 3, 4, 9 and 10, each chisel has side faces which are inclined relatively to each other, so that the thickness of the chisel decreases from its cutting edge rearward. The chisels are therefore adapted to form grooves which are wider than the ridges left between the grooves. I thus ensure the entire removal of the ridges.

I claim:

1. A slotting tool comprising a rotary spindle, and a plurality of annular collars fitted about and connected to the spindle to rotate therewith, each collar being provided with a pair of chisels, one positioned adjacent one edge of the collar and the other adjacent the opposite edge of the collar, and out of alignment with the first said chisel the arrangement being such that the chisels are disposed in a plurality of rows with those in each row in staggered relation to those in another row.

2. A slotting tool comprising a rotary spindle, and a plurality of annular collars fitted about and connected to the spindle to rotate therewith, each collar being provided with a pair of diametrically opposite chisels, one positioned adjacent one edge of the collar and the other adjacent the opposite edge of the collar, and out of alignment with the first said chisel, the arrangement being such that the chisels are disposed in a plurality of rows with those in each row in staggered relation to those in another.

In testimony whereof I have affixed my signature.

HOSEA HATHAWAY.